United States Patent
Steinder et al.

(10) Patent No.: US 9,218,213 B2
(45) Date of Patent: Dec. 22, 2015

(54) DYNAMIC PLACEMENT OF HETEROGENEOUS WORKLOADS

(75) Inventors: Malgorzata Steinder, Leonia, NJ (US); Ian Nicholas Whalley, Pawling, NY (US)

(73) Assignee: International Business Machines Corporation, Armonk, NY (US)

(*) Notice: Subject to any disclaimer, the term of this patent is extended or adjusted under 35 U.S.C. 154(b) by 2204 days.

(21) Appl. No.: 11/862,415

(22) Filed: Sep. 27, 2007

(65) Prior Publication Data

US 2008/0104605 A1   May 1, 2008

Related U.S. Application Data

(60) Provisional application No. 60/863,585, filed on Oct. 31, 2006.

(51) Int. Cl.
  *G06F 9/455* (2006.01)
  *G06F 9/46* (2006.01)
  *G06F 9/50* (2006.01)

(52) U.S. Cl.
  CPC .............. *G06F 9/505* (2013.01); *G06F 9/5033* (2013.01); *G06F 9/5038* (2013.01); *G06F 9/5044* (2013.01); *G06F 2209/504* (2013.01); *G06F 2209/505* (2013.01); *G06F 2209/506* (2013.01); *G06F 2209/5019* (2013.01); *Y02B 60/142* (2013.01)

(58) Field of Classification Search
None
See application file for complete search history.

(56) References Cited

U.S. PATENT DOCUMENTS

| | | | |
|---|---|---|---|
| 5,289,460 A | | 2/1994 | Drake, Jr. et al. |
| 5,355,371 A | | 10/1994 | Auerbach et al. |
| 5,517,494 A | | 5/1996 | Green |
| 5,586,264 A | * | 12/1996 | Belknap et al. ............... 725/115 |
| 5,629,980 A | | 5/1997 | Stefik et al. |
| 5,826,239 A | | 10/1998 | Du et al. |
| 5,831,975 A | | 11/1998 | Chen et al. |
| 5,870,545 A | | 2/1999 | Davis et al. |
| 5,890,133 A | | 3/1999 | Ernst |
| 6,252,856 B1 | | 6/2001 | Zhang |
| 6,751,659 B1 | | 6/2004 | Fenger et al. |
| 6,801,502 B1 | | 10/2004 | Rexford et al. |
| 6,947,434 B2 | | 9/2005 | Hundscheidt et al. |
| 6,950,871 B1 | | 9/2005 | Honma et al. |
| 7,062,500 B1 | | 6/2006 | Hall et al. |

(Continued)

OTHER PUBLICATIONS

K. Appleby et al., "Oceano—SLA-Based Management of a Computing Utility," IFIP/IEEE Symposium on Integrated Network Management, May 2001, pp. 1-14, Seattle, WA.

(Continued)

*Primary Examiner* — Corey S Faherty
(74) *Attorney, Agent, or Firm* — Preston J. Young; Ryan, Mason & Lewis, LLP

(57) ABSTRACT

Techniques for managing a system of heterogeneous applications are provided. A plurality of applications is classified into a plurality of application types. One or more of the plurality of applications in each of the plurality of application types are classified into one or more collections. A utility function of possible resource allocations is computed for each of the one or more collections. An application placement is computed that optimizes a global utility of the plurality of applications in accordance with the one or more utility functions. Placement and resource allocation of the plurality of applications are modified in the system in accordance with the application placement.

18 Claims, 2 Drawing Sheets

(56) References Cited

U.S. PATENT DOCUMENTS

| | | | |
|---|---|---|---|
| 7,246,254 | B2 | 7/2007 | Alur et al. |
| 7,304,955 | B2 | 12/2007 | Lee |
| 7,342,929 | B2 | 3/2008 | Bremler-Barr et al. |
| 7,363,339 | B2 | 4/2008 | Delany et al. |
| 7,418,523 | B2 | 8/2008 | Pettyjohn et al. |
| 7,593,928 | B2 | 9/2009 | Canon et al. |
| 7,676,578 | B1 | 3/2010 | Zhu et al. |
| 7,870,153 | B2 | 1/2011 | Croft et al. |
| 7,925,973 | B2 | 4/2011 | Allaire et al. |
| 8,042,132 | B2 | 10/2011 | Carney et al. |
| 2002/0112039 | A1* | 8/2002 | Ullman ............ 709/223 |
| 2002/0188527 | A1 | 12/2002 | Dillard et al. |
| 2003/0026268 | A1 | 2/2003 | Navas |
| 2003/0035380 | A1 | 2/2003 | Downing et al. |
| 2004/0025157 | A1 | 2/2004 | Blight et al. |
| 2004/0139150 | A1 | 7/2004 | McCanne et al. |
| 2005/0132371 | A1 | 6/2005 | Lopez-Estrada |
| 2005/0165643 | A1 | 7/2005 | Wilson et al. |
| 2005/0166233 | A1 | 7/2005 | Beyda et al. |
| 2006/0236324 | A1* | 10/2006 | Gissel et al. ............ 718/105 |
| 2006/0253471 | A1 | 11/2006 | Wasserman et al. |
| 2006/0268742 | A1 | 11/2006 | Chu et al. |
| 2007/0038567 | A1 | 2/2007 | Allaire et al. |
| 2007/0100967 | A1 | 5/2007 | Smith et al. |
| 2007/0156670 | A1 | 7/2007 | Lim |
| 2007/0180083 | A1 | 8/2007 | Adam et al. |
| 2007/0180453 | A1 | 8/2007 | Burr et al. |
| 2008/0040217 | A1 | 2/2008 | Dellovo |
| 2008/0065974 | A1 | 3/2008 | Campbell |
| 2008/0104605 | A1 | 5/2008 | Steinder et al. |
| 2009/0083150 | A1 | 3/2009 | Mashinsky |
| 2009/0132363 | A1 | 5/2009 | Powell et al. |

OTHER PUBLICATIONS

Y. Hamadi, "Continuous Resources Allocation in Internet Data Centers," IEEE/ACM International Symposium on Cluster Computing and the Grid, May 2005, pp. 566-573, UK.

C. Li et al., "Performance Guarantees for Cluster-Based Internet Services," IEEE/ACM International Symposium on Cluster Computing and the Grid, May 2003, 8 pages, Tokyo, Japan.

R. Levy et al., "Performance Management for Cluster-Based Web Services," IEEE Journal on Selected Areas in Communications, Dec. 2005, pp. 247-261, vol. 23, No. 12.

A. Karve et al., "Dynamic Placement for Clustered Web Applications," World Wide Web Conference, May 2006, 10 pages, Edinburgh, Scotland.

D. Feitelson et al., "Parallel Job Scheduling—a Status Report," 10th Workshop on Job Scheduling Strategies for Parallel Processing, 2004, pp. 1-9.

G. Khanna et al., "Application Performance Management in Virtualized Server Environments," NOMS 2006, Apr. 2006, pp. 373-381.

X. Zhang et al., "CoolStreamingIDONet: A Data-Driven Overlay Network for Peer-to-Peer Live Media Streaming," In IEEE INFOCOM '05, 2005, 10 pages.

M. Jelasity et al., "Gossip-Based Aggregation in Large Dynamic Networks," ACM Transactions on Computer Systems, Aug. 2005, pp. 219-252, vol. 23, No. 3.

A. Demers et al., "Epidemic Algorithms for Replicated Database Maintenance," ACM PODC, 1987, pp. 1-12.

A-M. Kermarrec et al., "Probabilistic Reliable Dissemination in Large-Scale Systems," IEEE Transactions on Parallel and Distributed Systems, Feb. 2003, pp. 1-11, vol. 14, No. 2.

V-H. Chu et al., "Early Experience with an Internet Broadcast System Based on Overlay Multicast," Proceedings of USENIX Annual Technical Conference, Jun. 2004, 17 pages.

J. Liang et al., "MON: On-Demand Overlays for Distributed System Management," WORLDS '05: Second Workshop on Real, Large Distributed Systems, 2005, pp. 13-18.

S. Banerjee et al., "Resilient Multicast Using Overlays," SIGMETRICS '03, Jun. 2003, 12 pages.

M.J. Freedman et al., "Non-Transitive Connectivity and DHTs," WORLDS '05: Second Workshop on Real, Large Distributed Systems, Dec. 2005, pp. 55-60.

P. Barham et al., "Xen and the Art of Virtualization," SOSP '03, Oct. 2003, 14 pages.

L. Peterson et al,, "A Blueprint for Introducing Disruptive Technology into the Internet," 1st Workshop on Hot Topics in Networks (HotNets-1), Oct. 2002, 6 pages.

P. Yalagandula et al., "A Scalable Distributed Information Management System," SIGCOMM '04, Aug. 2004, 12 pages.

M. Kwon et al., "Topology-Aware Overlay Networks for Group Communication," NOSSDAV '02, May 2002, 10 pages.

C. Intanagonwiwat et al., "Directed Diffusion: A Scalable and Robust Communication Paradigm for Sensor Networks," MobiCom '00, 2000, pp. 1-15.

I. Stoica et al., "Chord: A Scalable Peer-to-Peer Lookup Service for Internet Applications," SIGCOMM '01, Aug. 2001, pp. 1-12.

A. Rowstron et al., "Pastry: Scalable, Decentralized Object Location and Routing for Large-Scale Peer-to-Peer Systems," In Middleware 2001, Nov. 2001, 22 pages.

M. Castro et al., "Performance and Dependability of Structured Peer-to-Peer Overlays," DSN '04, Jun. 2004, 10 pages.

A. Medina et al., "BRITE: An Approach to Universal Topology Generation," MASCOTS '01, 2001, 8 pages.

Z. Cao et al., "Utility Max-Min: An Application-Oriented Bandwidth Allocation Scheme," Networking and Telecommunications Group College of Computing, Georgia Institute of Technology, 1999, pp. 793-801.

S. Abdelwahed et al., "Online Control for Self-Management in Computing Systems," Institute for Software Integrated Systems, 2004, pp. 1-8.

V. Cardellini et al., "The State of the Art in Locally Distributed Web-Server Systems," ACM Computing Surveys, vol. 34, No. 2, Jun. 2002, pp. 263-311.

R. Iyer, "CQoS: A Framework for Enabling QoS in Shared Caches of CMP Platforms," ICS'04, Jun. 26-Jul. 1, 2004, pp. 257-266, Saint-Malo, France.

P. Giovanni, "Managing the Response Time of Multi-Tiered Web Application," IBM, Nov. 23, 2005, pp. 1-39.

S. Graupner et al., "Control Architecture for Service Grids in a Federation of Utility Data Centers," Hewlett-Packard, Aug. 21, 2002, pp. 1-12.

S. Graupner et al., "Service-Centric Globally Distributed Computer," Hewlett-Packard, IEEE Internet Computing, Jul./Aug. 2003, pp. 36-43.

I. Foster et al., "The Different Faces of IT As Service," Queue, Jul./Aug. 2005, pp. 27-34.

C. Wu et al., "Achieving Performance Consistency in Heterogeneous Clusters," Department of Computer Science, Johns Hopkins University, 2004, 10 pages.

* cited by examiner

DYNAMIC PLACEMENT OF HETEROGENEOUS WORKLOADS

The present application claims priority to the U.S. provisional application identified as Ser. No. 60/863,585 filed on Oct. 31, 2006, the disclosure of which is incorporated by reference herein.

FIELD OF THE INVENTION

The present invention relates generally to application management, and more particularly, to methods and apparatus for management of heterogeneous workloads

BACKGROUND OF THE INVENTION

Many organizations rely on a heterogeneous set of applications to deliver critical services to their customers and partners. This set of applications includes web workloads typically hosted on a collection of clustered application servers and a back-end tier database. The application mix also includes non-interactive workloads such as portfolio analysis, document indexing, and various types of scientific computations. To efficiently utilize the computing power of their datacenters, organizations allow these heterogeneous workloads to execute on the same set of hardware resources and need a resource management technology to determine the most effective allocation of resources to particular workloads.

A traditional approach to resource management for heterogeneous workloads is to configure resource allocation policies that govern the division of computing power among web and non-interactive workloads based on temporal or resource utilization conditions. With a temporal policy, the resource reservation for web workloads varies between peak and off-peak hours. Resource utilization policies allow non-interactive workload to be executed when resource consumption by web workload falls below a certain threshold. Typically, resource allocation is performed with a granularity of a full server machine, as it is difficult to configure and enforce policies that allow server machines to be shared among workloads. Coarse-grained resource management based on temporal or resource utilization policies has previously been automated. See, K. Appleby et al., "Oceano—SLA-Based Management of a Computing Utility," IFIP/IEEE Symposium on Integrated Network Management, Seattle, Wash., May 2001; and Y. Hamadi, "Continuous Resources Allocation in Internet Data Centers," IEEE/ACM International Symposium on Cluster Computing and the Grid, Cardiff, UK, May 2005, pp. 566-573.

Once server machines are assigned to either the web or the non-interactive workload, existing resource management policies can be used to manage individual web and non-interactive applications. In the case of web workloads, these management techniques involve flow control and dynamic application placement. See, C. Li et al., "Performance Guarantees for Cluster-Based Internet Services," IEEE/ACM International Symposium on Cluster Computing and the Grid, Tokyo, Japan, May 2003; G. Pacifici et al., "Performance Management for Cluster-Based Web Services," IEEE Journal on Selected Areas in Communications, Vol. 23, No. 12, December 2005; and A. Karve et al., "Dynamic Placement for Clustered Web Applications," World Wide Web Conference, Edinburgh, Scotland, May 2006. In the case of non-interactive workloads, the techniques involve job scheduling, which may be performed based on various existing scheduling disciplines. See, D. Feitelson et al., "Parallel Job Scheduling—a Status Report," 10th Workshop on Job Scheduling Strategies for Parallel Processing, 2004, pp. 1-16. To effectively manage heterogeneous workloads, a solution is needed that combines flow control and dynamic placement techniques with job scheduling.

SUMMARY OF THE INVENTION

The embodiments of present invention provide a system and method for management of heterogeneous workloads.

For example, in one aspect of the present invention, a method for managing a system of heterogeneous applications is provided. A plurality of applications is classified into a plurality of application types. One or more of the plurality of applications in each of the plurality of application types are classified into one or more collections. A utility function of possible resource allocations is computed for each of the one or more collections. An application placement is computed that optimizes a global utility of the plurality of applications in accordance with the one or more utility functions. Placement and resource allocation of the plurality of applications are modified in the system in accordance with the application placement.

In additional embodiments of the present invention, the steps of classifying the plurality of applications, classifying one or more of the plurality of applications, computing a utility function, computing an application placement, and modifying placement and resource allocation may be performed periodically in response to system events.

In further embodiments of the present invention, an execution profile for each of the one or more of the plurality of applications in a given one of the one or more collections may be obtained. Management policies for each of the one or more of the plurality of applications may be obtained. The utility function for the given one of the one or more collections may be computed in accordance with at least one of an execution profile for the one or more of the plurality of applications, service level agreement goals for the one or more of the plurality of applications, and a state of the system.

In further aspects of the present invention an apparatus for managing a system of heterogeneous applications is provided as well as a method for making a computer implemented process to enable the management of a system of heterogeneous applications.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
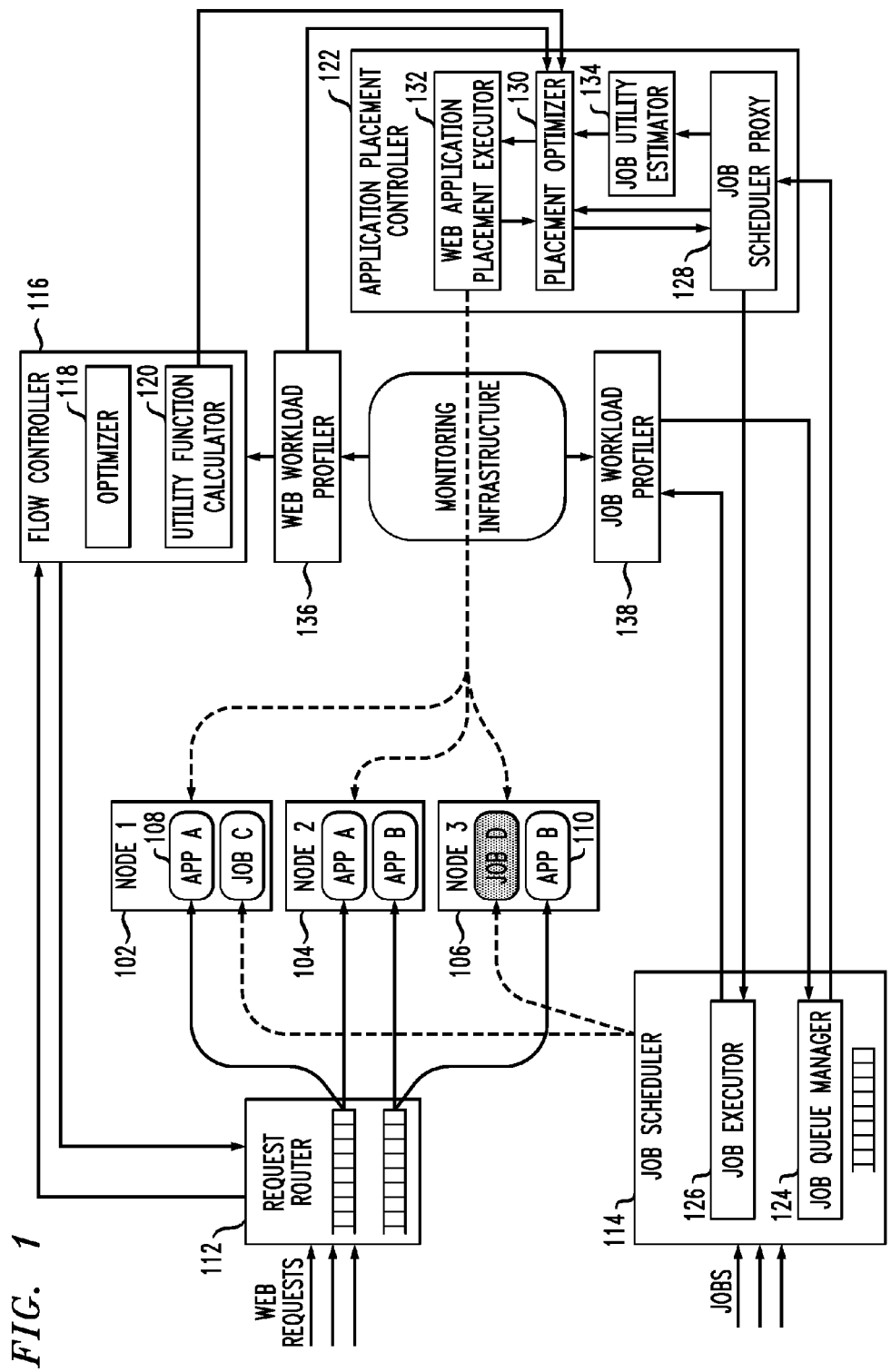
FIG. 1 is a diagram illustrating management system architecture for heterogeneous workloads, according to an embodiment of the present invention.

A set of machines, $N=\{1, \ldots, N\}$ and a set of applications $M=\{1, \ldots, M\}$ are provided. Using n and m, the sets of machines and applications are indexed, respectively. A set of containers C={1, . . . , C} are provided. The variable c is used to index into the set of containers. For each application there exists exactly one container. Using c(m), the container of application m is denoted. M(c) is used to represent the set of all applications that use container c.

For the purpose of resolving resource contention, applications are grouped into groups G={1, . . . , G} and use g to index into a set of groups. Each application belongs to exactly one group. Group for application m is denoted by g(m). A group may have more than one application. The set of all applications within type g is denoted by M(g).

Application is the smallest entity managed by the placement controller. Currently, only one application is deployed to a dynamic cluster, hence application is synonymous with dynamic cluster.

Application groups are created for the purpose of resource management. Contention among groups is resolved rather than individual applications. In the presence of no long-running work, all groups are singleton sets and they are basically redundant. Only long-running applications are grouped.

A container is an application server, a cluster, or a VM where applications execute. Examples of a container include a dynamic cluster, a DB instance, etc. In some cases, when an application executes directly on the OS, a container is nil, and it exists in the problem formulation only for notational convenience.

With each machine n, its load-independent and load-dependent capacities, $\Gamma_n$ and $\Omega_n$, are associated, which correspond to the memory and CPU power, respectively. Both values measure only the capacity available to workload controlled by WebSphere. Capacity used by other workloads is subtracted prior to invoking the algorithm. At any time, some of machine capacity is allocated to applications and containers. The remaining capacity is called residual capacity and denoted by symbols $\Gamma_n^r$ and $\Omega_n^r$, respectively.

With each application, its load independent demand, $\gamma_m$, is associated, which represents the amount of memory consumed by this application whenever it is started on a machine. Similarly, with each container, its load independent demand, $\gamma_c$, is associated, which represents the amount of memory consumed by this container whenever its instance is started on a machine. Since each application must be started in a container, the amount of memory required to start a single instance of an application on a machine is $\gamma_m + \gamma_{c(m)}$.

With each container load dependent demand $w_c$, is also associated, which is the amount of CPU power that is consumed when an instance of the container is started.

Load dependent requirements of applications are given in the form of utility functions.

For each group a utility function, $u_g$, is given that defines the degree of happiness from a particular allocation. It is assumed that this utility is given, and if there is more than one application in a group, there exists some oracle or other resource manager that divides resources among these applications. Note that groups that involve more than one application, group long-running work. Thus, the other manager or oracle is a scheduler managing this long-running work.

Applications that are not long-running ones form singleton types. Their utility is defined as follows. For each, a utility function, $\alpha_m(w)$, is given, which is a measure of happiness experienced by the application when w of CPU power is allocated to it. The utility function is a non-decreasing one.

Each container instance may run one or more application instances. With each container instance, another matrix, S, is associated, which represents application placement within containers. Cell $S_{j_k,m}$ contains a value of one if instance $j_k$ runs an instance of application m, and zero otherwise. It is assumed that all instances of an application started on the same machine must execute in separate instances of a container.

Symbol I is used to denote a placement matrix of applications on machines. Cell $I_{m,n}$ represents the number of instances of application m on machine n. Matrix I has the following relationships with T and S.

$$I_{m,n} = \sum_{j_k \in T_{c(m),n}} S_{j_k,m} \quad (1)$$

$$J_{c(m),n} \geq I_{m,n} \quad (2)$$

$$c \neq c(m) \Rightarrow S_{j_k,m} = 0 \quad (3)$$

Each container instance is associated with load dependent demand $w_c$ and load-independent demand $\gamma_c$. With an instance of application m running inside container $j_k$, allocated load-dependent demand $w_{j_k,m}$ and load-independent demand $\gamma_{j_k,m} = \gamma_m$ are associated. Symbol w is used to represent a matrix of CPU allocations to application instances. It is assumed that load-dependent and load-independent demand values of a container instance are given and cannot be controlled by the system. They represent the overhead associated with running a container instance. Similarly, load-independent demand of an application instance is not controlled by the system. On the other hand, load-dependent demand of an application instance is determined by the optimization problem.

In addition, a minimum CPU allocation may be configured for an application instance. Value $w_m^{min}$ indicates that whenever an instance of application m is started on a machine, it must receive at least $w_m^{min}$ of load-dependent capacity.

Symbol L is used to represent a load placement matrix. Cell $L_{m,n}$ denotes the amount of CPU speed consumed by all instances of application m on machine n. L is given for notational convenience.

Application placement is a triple P=(T, I, w). Notation P (change+) is used to denote placement P modified by making a non-empty list of changes change+. A set of possible changes includes the following operations:

$j_k \in T_{c,n}$ or $j_k \notin T_{c,n}$—adding or removing instance $j_k$ of container c on node n.

$S_{j_k,m}=1$ or $S_{j_k,m}=0$—starting or stopping an instance of application m in container instance $j_k$ $w_{j_k,m}=x$—setting load-dependent demand allocated to application m inside its instance running in container $j_k$ to x.

With each application group g, a utility function is given $u_g:P \times M \rightarrow (-\infty,1]$, where P is a universe of all possible placements.

Moreover, for each application group g, an oracle is given that produces $u_g(P,m)$, a utility of application m in placement P, and function $o_g(P)$, which for any given placement P produces an order in which applications in that group should be placed, starting from the application that is most profitable to place.

With each application the following parameters are associated:

The minimum number of machines on which application must be started, $N_m^{min}$ The maximum number of machines on which application may be started, $N_m^{max}$ $N_m$ is used to represent the number of machines where application m is running.

$$N_m = \sum_n \begin{cases} 1 & \text{if } I_{m,n} > 0 \\ 0 & \text{if } I_{m,n} = 0 \end{cases} \quad (4)$$

With each application the following parameters are associated:

The minimum number of instances that must be started for an application, $I_m^{min}$ The maximum number of instances that may be started for an application, $I_m^{max}$ $I_m$ is used to represent the number of machines where application m is running.

$$I_m = \sum_n I_{m,n} \quad (5)$$

An application instance may be pinned, which means that the algorithm is not allowed to stop the instance. Predicate pinned ($j_k$,m) is used to indicate whether or not an instance is pinned.

A container instance may be pinned, which means that the algorithm is not allowed to stop the instance. Predicate pinned ($j_k$) is used to indicate whether or not an instance is pinned.

An application may be in manual mode. In this case, its placement may not be changed on any machine. Predicate manual (m) is used to indicate whether or not an application is in manual mode.

A container may be in manual mode. In this case, its placement may not be changed on any machine. Predicate manual (c) is used to indicate whether or not a container is in manual mode.

An application may be placed on some machines but not on the others. Predicate allowed (m,n) is defined that evaluates to true and false when application m may and may not be placed on machine n, respectively.

Similarly, a container may be placed on some machines but not on the others. Predicate allowed (c,n) is defined that evaluates to true and false when container c may and may not be placed on machine n, respectively. In general, the set of machines on which application m may be placed is a subset of the set of machines where container c(m) may be placed.

An application may have a bottleneck that prevents it from using the capacity of the machine. Thickness value $\pi_{m,n}$ is used to represent the maximum amount of CPU power that may be consumed by a single instance of application m on machine n. Thickness values are used to drive vertical stacking of an application on a machine.

For each container c, there exist bounds on the number of container instances that may be created on machine n, $J_{c,n}^{min}$ and $J_{c,n}^{max}$.

Some applications cannot share machines with other applications. If application $m_1$, cannot be collocated with application $m_2$ then predicate collocate ($m_1$,$m_2$) returns false. Otherwise, the predicate returns true.

Some application instances may be suspended (removed from memory) and later resumed; others cannot. If an application instance is not suspendable, its pinned predicate is set to true.

Some application instances may be resumed on a different machine than the one they were suspended on. Migration restrictions are modeled by tweaking allocation restrictions. When a non-migratable application m is suspended on machine n, allowed (m,n) is set to true and allowed (m,$n_1$) to false for all $n_1 \neq n$.

Some applications may be allocated less power than they need. An application for which such a reduced allocation may be enforced is resource-controllable. All ARFM-managed workload is resource-controllable. Workload that reaches backend servers while bypassing the ODRs may not be resource controllable. To handle applications that are not resource-controllable, two parameters are needed:

The amount of CPU power requested by the application, $w_m^{req}$

Predicate controllable (m) indicating if an application is resource-controllable.

Applications that are not resource-controllable must always be allocated the minimum of $w_m^{req}$ and the capacity of the container they run on or they have to be stopped, as there is no way to enforce any reduced allocation once an application is started. Applications that are resource-controllable may be allocated any CPU power.

Non-divisible workloads are indicated by predicate divisible (m) which is set to false for such workloads. Transactional workloads are divisible.

Referring now to FIG. 1, a diagram illustrates management system architecture, according to an embodiment of the present invention. This system architecture represents one specific example of management system, a plurality of different system architectures that perform the methodology of the present invention are also possible. The managed system includes a set of heterogeneous server machines, referred to henceforth as node 1 102, node 2 104 and node 3 106. Web applications, app A 108, app B 110, which are served by application servers, are replicated across nodes to form application server clusters. Requests to these applications arrive at an entry request router 112 which may be either an L4 or L7 gateway that distributes requests to clustered applications 108, 110 according to a load balancing mechanism. Long-running jobs are submitted to a job scheduler 114, placed in its queue, and dispatched from the queue based on the resource allocation decisions of the management system.

The management architecture of FIG. 1 takes advantage of an overload protection mechanism that can prevent a web application from utilizing more than the allocated amount of resources. Such overload protection may be achieved using various mechanisms including admission control or OS scheduling techniques. Server virtualization mechanisms could also be applied to enforce resource allocation decisions on interactive applications.

In the system considered, overload protection for interactive workloads is provided by an L7 request router 112 which implements a flow control technique. Router 112 classifies incoming requests into flows depending on their target application and service class, and places them in per-flow queues. Requests are dispatched from the queues based on weighted-fair scheduling discipline, which observes a system-wide concurrency limit. The concurrency limit ensures that all the flows combined do not use more than their allocated re-source share. The weights further divide the allocated resource share among applications and flows.

Both the concurrency limit and scheduling weights are dynamically adjusted by a flow controller 116 in response to changing workload intensity and system configuration. Flow controller 116 builds a model of the system that allows it to predict the performance of the flow for any choice of concurrency limit and weights via optimizer 118. This model may also be used to predict workload performance for a particular allocation of CPU power. The functionality of flow controller 116 is used to come up with a utility function for each web application at utility function calculator 120, which gives a measure of application happiness with a particular allocation of CPU power given its current workload intensity and performance goal.

Long-running jobs are submitted to the system via job scheduler 114, which, unlike traditional schedulers, does not make job execution and placement decisions. In the system, job scheduler 114 only manages dependencies among jobs and performs resource matchmaking. Once dependencies are resolved and a set of eligible nodes is determined, jobs are submitted to an application placement controller (APC) 122 via a job queue manager 124.

Each job has an associated performance goal. An embodiment of the present invention supports completion time goals, but the system may be extended to handle other performance objectives. From this completion time goal an objective function is derived which is a function of actual job completion time. When job completes exactly on schedule, the value of the objective function is zero. Otherwise, the value increases or decreases linearly depending on the distance of completion time from the goal.

Job scheduler 114 uses APC 122 as an adviser to where and when a job should be executed. When APC 122 makes a placement decision, actions pertaining to long-running jobs are returned to job scheduler 114 and put into effect via a job executor component 126. Job executor 126 monitors job status and makes it available to APC 122 for use in subsequent control cycles.

APC 122 provides the decision-making logic that affects placement of both web and non-interactive workloads. To learn about jobs in the system and their current status, APC 122 interacts with job scheduler 114 via a job scheduler proxy 128. A placement optimizer 130 calculates the placement that maximizes the minimum utility across all applications. It is able to allocate CPU and memory to applications based on their CPU and memory requirements, where memory requirement of an application instance is assumed not to depend on the intensity of workload that reaches the instance. The optimization algorithm of APC 122 is improved; its inputs are modified from application CPU demand to a per-application utility function of allocated CPU speed, and the optimization objective is changed from maximizing the total satisfied CPU demand to maximizing the minimum utility across all applications. A web application placement executor 132 places applications on nodes 102, 104, 106 in an optimized manner.

Since APC 122 is driven by utility functions of allocated CPU demand and, for non-interactive workloads, objective functions of achieved completion times are only given, a way to map completion time into CPU demand, and vice versa, may also be provided. Recall that for web traffic a similar mechanism exists, provided by the flow controller. The required mapping is very difficult to obtain for non-interactive workloads, because the performance of a given job is not independent of CPU allocation to other jobs. After all, when not all jobs can simultaneously run in the system, the completion time of a job that is waiting in the queue for other jobs to complete before it may be started depends on how quickly the jobs that were started ahead of it complete, hence it depends on the CPU allocation to other jobs. In the system, simple but effective heuristics are implemented that allow aggregate CPU requirements to be estimated for all long-running jobs for a given value of utility function at job utility estimator 134. This estimation is used to obtain a set of data-points from which the utility function is later extrapolated. This estimation is used to obtain a set of data-points from which values needed to solve the optimization problem are later extrapolated.

To manage web and non-interactive workloads, APC relies on the knowledge of resource consumption by individual requests and jobs. The system includes profilers for both kinds of workloads. A web workload profiler 136 obtains profiles for web requests in the form of the average number of CPU cycles consumed by requests of a given flow. A job workload profiler 138 obtains profiles for jobs in the form of the number of CPU cycles required to complete the job, the number of threads used by the job, and the maximum CPU speed at which the job may progress.

A placement utility function is defined as $U(P)=(u_{g(m_1)}(P, m_1), \ldots, u_{g(m_M)}(P,m_M))$, where groups inside the vector are ordered according to increasing $u_{g(m)}(P,m)$. For such a utility vector, ordering operator may be defined. Vector $(u_{g(m_1)}(P, m_1), \ldots, u_{g(m_M)}(P,m_M))$ is greater (or less) than $(u_{g(m_1')}(P', m_1'), \ldots, u_{g(m_M')}(P',m_M'))$, if there exists k such that $u_{g(m_k)}(P, m_k)$ is greater (or less) than $u_{g(m_k')}(P',m_k')$ and for all l<k, $u_{g(m_l)}(P, m_l)=u_{g(m_l')}(P', m_l')$.

Data described in Section 1 and current placement $p^{old}=(T^{old}, S^{old}, w^{old})$ is given.

The objective of placement algorithm is to find new placement P=(T, S, w) that solves the following optimization problem.

$$\max U(P) \quad (6)$$

subject to:

1. memory constraint:

Memory constraint in Eq. 7 means that there will be attempts to calculate placement that does not overload memory on any machine. However, if instances already placed and pinned on a machine use more than that machine's memory, it will not be attempted to remove them.

$$\forall_n \sum_c \sum_{j_k \in T_{c,n}} \left( \gamma_c + \sum_{m \in M(c)} S_{j_k,m} \gamma_m \right) \leq \Gamma_n \quad (7)$$

2. load-dependent capacity constraint:

Load-dependent capacity constraint in Eq. 8 means that CPU power of any machine will not be overloaded.

$$\forall_n \sum_c \sum_{j_k \in T_{c,n}} \left( w_c + \sum_{m \in M(c)} w_{j_k,m} \right) \leq \Omega_n \quad (8)$$

3. maximum load constraint:

Maximum load constraint in Eq. 9 limits the amount of CPU demand that may be satisfied by an instance of an application.

$$\forall_n \forall_c \forall_{j_k \in T_{c,n}} w_{j_k,m} \leq S_{j_k,m} \pi_{m,n} \quad (9)$$

4. minimum and maximum machines constraint:

Minimum and maximum machines constraints in Eq. 10 states that the number of machines on which an application is running must be within specified range, unless machines where an application is allowed to run, run out. An application cannot run on a machine forbidden in allocation restrictions. An application in manual mode can only run on as many machines as in the last placement.

$$\forall_m N_m^{min} \leq N_m \leq N_m^{max} \quad (10)$$

5. minimum and maximum instances constraint:

Minimum and maximum machines constraints in Eq. 11 states that the number of instances of an application must be within specified range, unless machines where an application is allowed to run out. An application cannot run on a machine forbidden in allocation restrictions. An application in manual mode, can only run as many instances as in the last placement.

$$\forall_m I_m^{min} \leq I_m \leq I_m^{max} \quad (11)$$

6. minimum and maximum instances on node constraint:

Minimum and maximum instances on node constraint in Eq. 12 states that the number of instances of a container on a node must stay within specified limits.

$$\forall_c J_{c,n}^{min} \leq J_{c,n} \leq J_{c,n}^{max} \quad (12)$$

7. pinning constraints:

Pinning constraint in Eq. 13 state that an application instance that is pinned on a node must not be stopped. As a result, the container instance where it is running must not be stopped either. Pinning constraint in Eq. 14 states that a pinned container instance may not be stopped.

$$\forall_c \forall_n \forall_{k_k \in T_{c,n}^{old}} \forall_m S_{j_k,m}^{old} = 1 \wedge \text{pinned}(j_k, m) \Rightarrow j_k \in T_{c,n} \wedge S_{j_k,m} \quad (13)$$
$$= 1$$

$$\forall_c \forall_n \forall_{j_k \in T_{c,n}^{old}} \text{pinned}(j_k) \Rightarrow j_k \in T_{c,n} \quad (14)$$

8. manual mode constraints:

Manual mode constraint in Eq. 15 states that if an application is in manual mode, none of its running instances may be stopped. Eqs. 16-17 state that if an application is in manual mode, no new instances of the application may be started. Eq. 18 states that if a container is in manual mode, its placement cannot change.

$$\forall_m \forall_n \forall_{j_k \in T_{c(m),n}^{old}} \text{manual}(m) \wedge S_{j_k,m}^{old} = 1 \Rightarrow j_k \in T_{c(m),n} \wedge S_{j_k,m} \quad (15)$$
$$= 1$$

$$\forall_m \forall_n \forall_{j_k \in T_{c(m),n}^{old}} \text{manual}(m) \wedge S_{j_k,m}^{old} = 0 \Rightarrow j_k \notin T_{c(m),n} \vee S_{j_k,m} \quad (16)$$
$$= 0$$

$$\forall_m \forall_n \forall_{j_k \in T_{c(m),n}} \setminus T_{c(m),n}^{old} \text{manual}(m) \Rightarrow S_{j_k,m} = 0 \quad (17)$$

$$\forall_c \forall_n \text{manual}(c) \Rightarrow T_{c(m)} = T_{c(m)}^{old} \quad (18)$$

9. allocation restrictions:

Constraints 19 and 20 limit where instances of an application or a container may be running.

$$\forall_m \forall_n \forall_{j_k \in T_{c(m),n}} \neg \text{allowed}(m,n) \Rightarrow S_{j_k,m} = 0 \quad (19)$$

$$\forall_c \forall_n \Rightarrow \text{allowed}(c) \neg T_{c,n} = 0 \quad (20)$$

10. Collocation constraint:

Collocation constraint in Eq. 21 states that applications that have a collocation restriction cannot have instances running on the same node.

$$\forall_{m_1} \forall_{m_2} \forall_n \left( \neg \text{coplace}(m_1, m_2) \Rightarrow \right.$$
$$\left. \left( \sum_{j_k \in T_{c(m_1),n}} S_{j,m_1} = 0 \vee \sum_{j_k \in T_{c(m_2),n}} S_{j_k,m_2} = 0 \right) \right) \quad (21)$$

11. minimum allocation constraint:

$$\forall_n \forall_m \forall_{j_k \in T_{c(m),n}} S_{j_k,m} = 1 \Rightarrow w_{j_k,m} \geq w_m^{min} \quad (22)$$

12. resource-control constraint:

Resource control restrictions in Eq. 23 require that a non-resource-controllable partition always be allocated its full CPU demand.

$$\forall_m \left( \neg \text{controllable}(m) \Rightarrow \sum_n \sum_{j_k \in T_{c(m),n}} w_{j_k,m} \geq w_m^{req} \right) \quad (23)$$

13. load-divisibility constraint:

Non-divisible workloads must be satisfied within one instance, as stated in Eq. 24.

$$\forall_m \left( \neg \text{divisible}(m) \Rightarrow \sum_n \sum_{j_k \in T_{c(m),n}} S_{j_k,m} = 1 \right) \quad (24)$$

The placement algorithm proceeds in three phases: demand capping, placement calculation, and maximizing load distribution. Demand capping constraints the amount of CPU capacity that may be allocated to an application, which is used by placement calculation. The phase of maximizing load distribution takes placement obtained by placement calculation phase and calculates the best corresponding load distribution. Placement change phase is where actual placement optimization is done. The placement change problem is known to be NP-hard and heuristics must be used to solve it. Several heuristics are applicable also in the placement problem with non-linear optimization objective.

Placement change method. The placement change phase is executed several times, each time being referred to as a 'round'. Each round first calculates the load distribution that maximizes the utility of the initial placement. It then invokes the placement change method, which makes a single new placement suggestion based on the provided initial placement. In the first round, the initial placement is the current placement. In subsequent rounds, the initial placement is the placement calculated in the previous round. Additionally, in the first round, the method may be invoked multiple times with various additional instance pinning constraints. For example, in one invocation, all instances are pinned (thus only new instances may be started). In another invocation, all instances that receive load are pinned. Up to 10 rounds may be performed. The round loop is broken out of earlier if no improvement in placement utility is observed at the end of a round.

The placement change method iterates over nodes in a so called outer loop. For each node, an intermediate loop is invoked, which iterates over all instances placed on this node and attempts to remove them one by one, thus generating a set of configurations whose cardinality is linear in the number of instances placed on the node. For each such configuration, an inner loop is invoked, which iterates over all applications whose satisfied demand is less than the limit calculated in the capping phase, attempting to place new instances on the node as permitted by the constraints.

Utility-based heuristics. The utility-based version of the algorithm introduces several new heuristics that concern the ordering of nodes, applications, and instances in the outer, intermediate, and inner loops of the algorithm and shortcuts that help reduce the algorithm complexity.

For each application and for each node utility-of-stopping is calculated as the application utility that would be obtained if this instance alone was stopped. For each node its utility-of-stopping is obtained as the maximum utility-of-stopping among all application currently hosted on it. In the outer loop nodes are ordered according to the decreasing utility of stopping. Nodes with sufficient memory to host one more instance of some unsatisfied application have a utility-of-stopping equal to 1. Among nodes with equal utility-of-stopping the one that has the most CPU capacity available is selected, which helps us maximize placement utility without making unnecessary changes. It is also used in a shortcut: node iteration can stop once a node is reached whose utility-of stopping is less than or equal to the lowest utility of an unsatisfied application.

In the intermediate loop, instances are visited in decreasing order of utility-of-stopping. The loop is broken out of when the utility-of-stopping becomes lower than or equal to the lowest utility of an unsatisfied application.

In the inner loop, applications are visited in the increasing order of their utility in the current placement.

Finding a maximizing load distribution. While the placement change method calculates a load distribution matrix along with the placement matrix, due to the heuristic nature of algorithm, it does not necessarily find the best load distribution for the calculated placement. In fact, better load distributions may be found quite easily outside of the method. To find a maximizing load distribution a non-linear optimization problem maxL U(L) is solved subject to linear constraints, which were outlined before. Standard approximation techniques are used (see, for example, G. B. Dantzig, "Linear Programming and Extensions, Princeton University (1963), and R. K. Ahuia et al., "Network Flows: Theory, Algorithms, and Applications," Prentice Hall (1993)) to solve this optimization problem achieving an approximation that is within a configurable □U of the optimum. Capping application demand. At the beginning of the placement algorithms the demand of each application is capped at a value that corresponds to a maximizing load distribution in a perfect placement, which is a placement that is not constrained by memory, minimum and maximum constraints, and collocation constraints. In other words, an upper bound is calculated for the achievable placement utility. In the main method of the algorithm, this capping is observed while deciding which applications are unsatisfied and how much CPU capacity should be allocated to an application instance. This aids the heuristic of the inner loop, which otherwise allocates the maximum available CPU power to an application instance it creates. Since the algorithm is driven by non-decreasing utility function over a continuous range, without some upper bound, the inner loop would always allocate the entire available CPU power of a box to a single application without giving other applications a chance to use the node. This would result in coarse and unfair allocation of resources, and possibly in starving some applications.

When capping is given, the CPU allocation may be constrained to any application believed to obtain an optimal, unconstrained placement. Naturally, it is possible that no other application will be able to use the node, which seems to result in wasted node capacity. However, this under-allocation will be fixed by the maximizing load distribution phase, which will give the unallocated capacity of a node back to the previously capped application.

To calculate the capping limits, the maximizing load distribution problem is solved by providing a complete placement as input, where complete placement includes the maximum number of instances of each application on every node as long as allocation restrictions are not violated.

3.3 Placement control loop

The basic algorithm, as described above, is surrounded by the Placement control loop, which resides within the Executor in FIG. 1. This is designed to have the Application Placement Controller periodically inspect the system to determine if placement changes are now required to better satisfy the changing extant load. The period of this loop is configurable, but is typically one minute—however, this loop is interrupted when the configuration of the system is changed, thus ensuring that the system is responsive to administrative changes.

Figure 2:
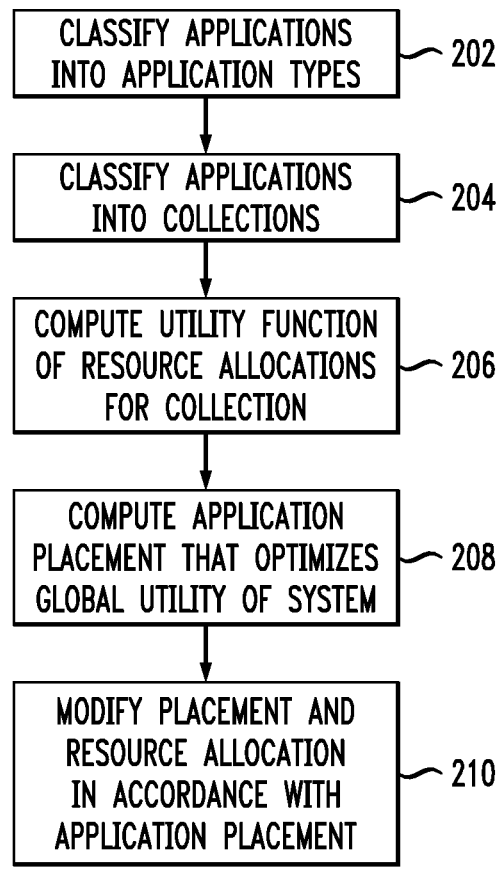
FIG. 2 is a flow diagram illustrating a management methodology for a system of heterogeneous workloads for the system architecture of FIG. 1, according to an embodiment of the present invention.

Referring now to FIG. 2, a flow diagram illustrates illustrating a management methodology for a system of heterogeneous workloads for the system architecture of FIG. 1, according to an embodiment of the present invention. The methodology begins in block 202 where applications are classified into a plurality of application types. In block 204, the applications in each application type are classified into one or more collections. In block 206, a utility function of possible resource allocations for each of the collections is computed. In block 208, an application placement that optimizes a global utility of the applications is computed in accordance with the utility function. In block 210, placement and resource allocation of the system are modified in accordance with the application placement.

Recall that application groups are used to resolve resource contention among multiple workloads. Placement algorithm resolves contention by looking at application utility at a group level. Within a group, contention is resolved using other mechanisms that depend on the type of workload represented by a group. In particular, the concept of a group is introduced to represent long running workloads, which consist of a set of jobs that are scheduled by some scheduler. The scheduler decides which jobs should be running at a given time given the amount of resources allocated to it. Placement controller decides how many resources should the scheduler receive such that the utilities of jobs are aligned with utilities of other workloads. The oracle for long-running workload is responsible for emulating the decisions made by a scheduler in hypothetical scenarios.

Another example where application groups may be useful is when within certain workload there is no mechanism to control resource usage among its applications, but there is a way to resource-control the total workload. For example, there may be two non-resource controllable applications deployed to the same virtual server container. The oracle for this application group would need to model the performance of both applications under various resource allocations to a container and based on the model estimate their utility.

The oracle for an application group is responsible for estimating the utility of each application in the group, selecting the most beneficial application to place, and calculating the amount of demand that needs to be allocated to applications in a group to meet certain utility goal. In this paper, oracles for two types of workloads are discussed: transactional and long-running.

Transactional workload is the one that is composed of flows of request, where for each request there is a response. These workloads have a characteristic that their request flow may be intercepted and controlled by a gateway process, which provides means of monitoring and resource controlling the workload. For each application that has characteristic of transactional workload, an application group is created. Properties of the group are thus identical with properties of the application.

Hence, the following properties.

$$o_g = (m), \text{ where } g = g(m) \tag{42}$$

$$u_g(P) = u_m\left(\sum_n L_{m,n}\right) \tag{43}$$

$$u_g\left(P(S_{j_k,m} = 0, w_{j_k,m} = 0)\right) = u_m\left(\sum_n L_{m,n} - w_{j_k,m}\right) \tag{44}$$

For a given target utility u* the amount of demand that delivers this utility is $u_m^{-1}(u^*)$.

Utility function for a transactional application is estimated using modeling and profiling techniques described in G. Pacifici et al., "Dynamic Estimation of CPU Demand of Web Traffic," Valuetools, Pisa, Italy (2006) and G. Pacifici et al., "Performance Management for Cluterbased Web Services," IEEE Journal on Selected Areas in Communications 23 (2005).

With each job m the following parameters are associated.

profile

Job profile describes job workload characteristics in terms of resource requirements. Each job m is a sequence of stages, $s_1, \ldots, s_{N_j}$. For each stage $s_k$:

the amount of CPU cycles consumed in this stage, $\alpha_k$ the maximum speed with which the stage may run, $w_k^{max}$ the minimum speed with which the stage must run, whenever it runs, $w_k^{min}$ memory requirement $\gamma_k$ earliest allowed start timer $T_m^{start}$ When $T_m^{start}$ is earlier than clock time at the time of submission, submission time is taken completion time goal $T_m > T_m^{start}$ Completion time goal $T_m$ is clock time when job must have completed.

current status

Current status may be: running, not-started, suspended, paused availability of control knobs Availability of control knobs is defined by a set of flags: isMigratable, isSuspendable, isResourceControllable.

CPU time consumed thus far, $\alpha_m^*$ importance level, $l \in \{1 \ldots 100\}$ In each control cycle, the placement algorithm is provided with minimum and maximum CPU requirements as well as with memory demand. These values are estimated conservatively as follows.

Let us define the number of stages completed thus far, $D_m^{done}$.

$$D_m^{done} = \max_D \sum_{i=1} \alpha_i \leq \alpha_m^* \tag{45}$$

The amount of outstanding work in stage $D_m^{done}+1$ is thus $$\alpha_{D_m^{done}+1}^r = \sum_{i=1}^{D_m^{done}+1} \alpha_i - \alpha_m^*$$

and the minimum time required to complete this stage is $$t_{D_m^{done}+1}^r = \frac{\alpha_{D_m^{done}+1}^r}{w_{D_m^{done}+1}^{max}}$$

Let T be the minimum lifetime of placement change affecting m. Then, the last stage that may be executed during this time is $D_m^{to\text{-}execute}$.

$$D_m^{to\text{-}execute} = \begin{cases} D_m^{done} + 1 & \text{if } \alpha_{D_m^{done}+1}^r \geq T w_{D_m^{done}+1}^{max} \\ \min_D \sum_{i=D_m^{done}+2}^{D} \frac{a_i}{w_i^{max}} \geq T - t_{D_m^{done}+1}^r & \text{otherwise} \end{cases} \tag{46}$$

Job input parameters are defined as follows:

$$w_m^{req} = \max_{D_m^{done}+1 \leq i \leq D_m^{to\text{-}execute}} w_i^{max} \tag{47}$$

$$\gamma_m = \max_{D_m^{done}+1 \leq i \leq D_m^{to\text{-}execute}} \gamma_i \tag{48}$$

$$w_m^{min} = \max_{D_m^{done}+1 \leq i \leq D_m^{to\text{-}execute}} w_i^{min} \tag{49}$$

For each job an objective function is defined that maps actual job completion time $t_m$ to a measure of satisfaction as follows.

$$O_m(t_m) = \begin{cases} \dfrac{T_m - t_m}{T_m - T_m^{start}} & \text{if } t_m \leq T_m \\ \dfrac{T_m - t_m}{l(T_m - T_m^{start})} & \text{if } t_m > T_m \end{cases} \tag{50}$$

The definition of hypothetical utility function is provided, which is used to guide placement algorithm. The function is hypothetical as it does not take into account possible placements. Given total allocated demand w to an application group, it returns the achievable utility for any application that belongs to the group as if any placement was possible.

Let $\alpha^*$ be the vector of CPU cycles completed by applications belonging to application group g. Let $t_{now}$ be current time. Let $u_1 = -\infty, u_2, \ldots, u_R = 1$, where R is a small constant, be the set of these sampling points. Two matrices W and V are created. Cells $W_{i,m}$ and $V_{i,m}$ contain the average speed with which application m should execute starting from $t_{now}$ to achieve utility $u_i$ and value $u_i$, respectively, if it is possible for application m to achieve utility $u_i$. Otherwise, cells $W_{i,m}$ and $V_{i,m}$ contain the average speed with which application m should execute starting from $t_{now}$ to achieve its maximum achievable utility and the value of the maximum utility, respectively.

To determine whether it is possible to achieve utility $u_i$, a simple test is performed as follows.

$$t^r_{D_m^{done}+1} + \sum_{i=D_m^{done}+2}^{N_m} \frac{\alpha_i}{w_i^{max}} \le T_m - t_{now} \qquad (51)$$

If the above condition holds, application m can achieve utility $u_i$. In order to achieve $u_i$ it must complete at time $t_m^i = O_m^{-1}(u_i)$. It must therefore execute with the average speed of $w_m(u_i)$, which is calculated as follows.

$$w_m(u_i) = \frac{\sum_i \alpha_i - \alpha_m^*}{t_m - t_{now}} \qquad (52)$$

We then set $W_{i,m} = w_m(u_i)$ and $V_{i,m} = u_i$.

When application m cannot achieve utility $u_i$, the maximum achievable utility is calculated, as follows.

$$t_m^{best} = t_{now} + t^v_{D_m^{done}+1} + \sum_{i=D_m^{done}+2}^{N_m} \frac{\alpha_i}{w_i^{max}} \qquad (53)$$

$$u_m^{max} = O_m(t_m^{best}) \qquad (54)$$

Then, the CPU speed is calculated as required by each application m to achieve this utility, as follows.

$$w_m(u_m^{max}) = \frac{\sum_i \alpha_i - \alpha_m^*}{t_m^{best} - t_{now}} \qquad (55)$$

We set $W_{i,m} = w_m(u_m^{max})$ and $V_{i,m} = u_m^{max}$.

Given matrices W and V, the following useful quantities are calculated.

CPU speed required for application m to achieve utility u;

$$\tilde{w}_m(u) = \begin{cases} 0 & \text{if } v = -\infty \\ W_R & \text{if } u \ge \max_k V_{k,m} \\ W_{k,m} + \frac{(W_{k+1,m} - W_{k,m})(u - V_{k,m})}{V_{k+1,m} - V_{k,m}} & \text{otherwise} \end{cases} \qquad (56)$$

Where k is such that $V_{k,m} < u \le V_{k+1,m}$.

Expected utility of application m when total allocation of CPU power to application group g is w $$\tilde{u}_m(w) = \qquad (57)$$

$$\begin{cases} -\infty & \text{if } w = 0 \\ V_R & \text{if } w \ge \max_k \sum_m W_{k,m} \\ V_{k,m} + \frac{(V_{k+1,m} - V_{k,m})\left(w - \sum_m W_{k,m}\right)}{\sum_m W_{k+1,m} - \sum_m W_{k,m}} & \text{otherwise} \end{cases}$$

Where k is such that $\Sigma_m W_{k,m} < u \le \Sigma_m W_{k+1,m}$.

Applications in long-running application group are ordered according to increasing maximum achievable utility. In other words, if $u_{m_1}^{max} < u_{m_2}^{max}$ then application $m_1$ precedes $m_2$ in ordering $o_g$.

The average amount of demand required by application m to deliver utility u is $\tilde{w}_m(u)$. Note that u may not be achievable. In this case, $\tilde{w}_m(u)$ is the amount of demand needed to achieve the highest achievable utility.

The minimum amount of demand needed to achieve utility u is calculated as follows.

$$D_m^{must-do} = \max_D \sum_{i=D}^{N_m} \frac{\alpha_i}{w_i^{max}} > O_m^{-1}(u) - T \qquad (58)$$

$$T^{saved} = O_m^{-1}(u) - \max_{D_m^{must-do}+1} \sum_{i=D}^{N_m} \frac{\alpha_i}{w_i^{max}} \qquad (59)$$

$$\alpha_m^{must-do} = \qquad (60)$$

$$\begin{cases} \alpha^r_{D_m^{done}+1} + \sum_{D=D_m^{done}+2}^{D_m^{must-do}} \alpha_D - T^{saved} w_{D_m^{must-do}}^{max} & \text{if } D_m^{must-do} > D_m^{done} \\ 0 & \text{otherwise} \end{cases}$$

The minimum allocation is $$\frac{\alpha_m^{must-do}}{T}.$$

Let P be a given placement and T the length of control cycle. Let $w_m$ be the amount of CPU power allocated to application m in placement P. In this cycle, application m will execute through stages $D_m^{done}$ 1 to $D_m^{last}$, where $D_m^{last}$ is calculated as follows.

$$D_m^{last} = \begin{cases} D_m^{done} + 1 & \text{if } \alpha^r_{D_m^{done}+1} \geq T\min(w^{max}_{D_m^{done}+1}, w_m) \\ \min_D \sum_{i=D_m^{done}+2}^{D} \frac{\alpha_i}{\min(w_i^{max}, w_m)} \geq T - \frac{\alpha^r_{D_m^{done}+1}}{\min(w^{max}_{D_m^{done}+1}, w_m)} & \text{otherwise} \end{cases} \quad (61)$$

In stage $D_m^{last}$, the execution will last for the time $T^{last}$ before the cycle completes.

$$T^{last} = \begin{cases} T & \text{if } D_m^{last} = D_m^{done}+1 \\ T - \frac{\alpha^r_{D_m^{done}+1}}{\min(w^{max}_{D_m^{done}+1}, w_m)} - \sum_{i=D_m^{done}+2}^{D_m^{last}-1} \frac{\alpha_i}{\min(w_i^{max}, w_m)} & \text{otherwise} \end{cases} \quad (62)$$

The amount of work performed in stage $D_m^{last}$ will be $$\min(w^{max}_{D_m^{last}}, w_m)T^{last},$$

and the amount of work remaining to complete after the cycle finished will be $$\alpha^r_{D_m^{last}} = \alpha_{D_m^{last}} - \min(w^{max}_{D_m^{last}}, w_m)T^{last}.$$

This, after the cycle completes, the total amount of CPU cycles completed by application m will be $$a_m^{**} = \sum_{i=1}^{D_m^{last}} \alpha_i - \alpha^r_{D_m^{last}}.$$

To calculate utility of application m given placement P vector $\alpha^*$ is first updated by replacing $\alpha_m^*$ with $\alpha_m^{**}$ for all applications in g that have a non-zero allocation of CPU demand in P. Set $t_{now}=t_{now}+T$. Then use hypothetical utility calculation to obtain $\tilde{u}_m(\Sigma_n \Sigma_{m \in M(g)} \Sigma_{j_k \in T_c(m),n} w_{j_k,m})$. Note that this calculation of utility is concrete for the duration of the next cycle, as the placement for this time span is known, but it remains hypothetical following the coming cycle.

Figure 3:
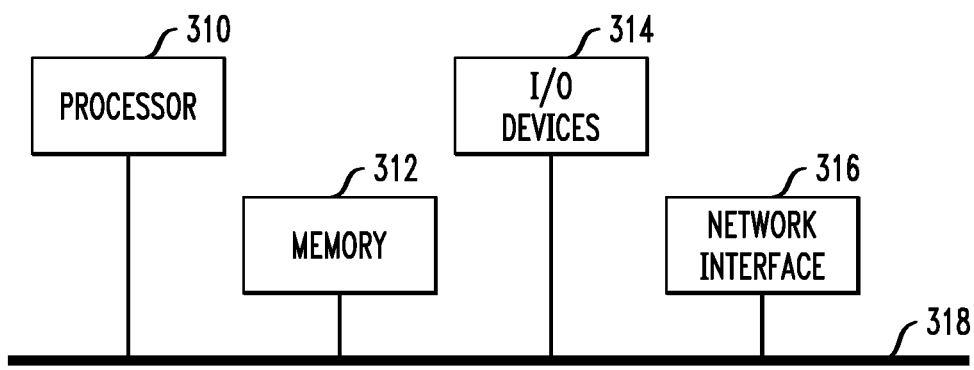
FIG. 3 is a block diagram illustrating an illustrative hardware implementation of a computing system in accordance with which one or more components/methodologies of the invention may be implemented, according to an embodiment of the present invention.

Referring now to FIG. 3, a block diagram illustrates an illustrative hardware implementation of a computing system in accordance with which one or more components/methodologies of the invention (e.g., components/methodologies described in the context of FIGS. 1 and 2) may be implemented, according to an embodiment of the present invention.

As shown, the computer system may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Memory 312 is an example of a computer readable storage medium.

In addition, the phrase "input/output devices" or "I/O devices" as used herein is intended to include, for example, one or more input devices for entering speech or text into the processing unit, and/or one or more output devices for outputting speech associated with the processing unit. The user input speech and the speech-to-speech translation system output speech may be provided in accordance with one or more of the I/O devices.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

What is claimed is:

1. A method for managing a system of heterogeneous applications comprising the steps of:

classifying a plurality of applications into a plurality of application types, wherein the plurality of applications comprises heterogeneous applications, and the heterogeneous applications comprise at least one interactive workload-type application and at least one non-interactive workload-type application;

classifying one or more of the plurality of applications in each of the plurality of application types into one or more collections;

computing a utility function of possible resource allocations for each of the one or more collections comprising the steps of: (i) obtaining an execution profile for each of the plurality of applications in a given one of the one or more collections; (ii) obtaining management policies for each of the plurality of applications; and (iii) computing the utility function for the given one of the collections in accordance with the execution profiles for the plurality of applications, service level agreement goals for the plurality of applications, and a state of the system;

computing an application placement that optimizes a global utility of the plurality of applications in accordance with the one or more utility functions; and modifying placement and resource allocation of the plurality of applications in the system in accordance with the application placement;

wherein an execution profile for a given interactive workload-type application comprises an average number of processor cycles consumed by requests of a given flow associated with the given interactive workload-type application, and an execution profile for a given non-interactive workload-type application comprises the number of processor cycles used to complete a job associated with the given non-interactive workload-type application, the number of threads used by the job, and the maximum processor speed at which the job progresses.

2. The method of claim 1, wherein the steps of classifying the plurality of applications, classifying one or more of the plurality of applications, computing a utility function, computing an application placement, and modifying placement and resource allocation is performed periodically in response to system events.

3. The method of claim 1, wherein, in the step of obtaining an execution profile, the heterogeneous applications comprise all long-running applications known to the system.

4. The method of claim 1, further comprising the step of computing an intermediate utility function for each of the one or more of the plurality of applications based on a processing unit assigned to the one or more of the plurality of applications in the given one of the one or more collections.

5. The method of claim 4, further comprising the step of using the intermediate utility function to obtain a processing unit allocation for a given application to achieve a certain utility.

6. The method of claim 4, further comprising the step of using the intermediate utility function to obtain a resultant utility of a given application given total processing unit allocation to the given one of the one or more collections.

7. The method of claim 4, wherein, in the step of computing an intermediate utility function, the intermediate utility functions for each collection of applications are updated each time the placement of any application within the associated collection is changed as the algorithm progresses.

8. The method of claim 1, further comprising the step of calculating a speed at which each of the one or more of the plurality of applications must execute so as to obtain a resultant utility.

9. The method of claim 1, further comprising the step of calculating a minimum processing unit allocation assigned to each of the one or more of the plurality of applications, and the given one of the one or more collections, to achieve a resultant utility.

10. The method of claim 1, further comprising the step of determining a utility for the given one of the one or more collections of a given placement.

11. Apparatus for managing a system of heterogeneous applications, comprising:
a memory; and
at least one processor coupled to the memory and operative to: (i) classify a plurality of applications into a plurality of application types, wherein the plurality of applications comprises heterogeneous applications, and the heterogeneous applications comprise at least one interactive workload-type application and at least one non-interactive workload-type application; (ii) classify one or more of the plurality of applications in each of the plurality of application types into one or more collections; (iii) compute a utility function of possible resource allocations for each of the one or more collections comprising the steps of: (a) obtaining an execution profile for each of the plurality of applications in a given one of the one or more collections; (b) obtaining management policies for each of the plurality of applications; and (c) computing the utility function for the given one of the collections in accordance with the execution profiles for the plurality of applications, service level agreement goals for the plurality of applications, and a state of the system; (iv) compute an application placement that optimizes a global utility of the plurality of applications in accordance with the one or more utility functions; and (v) modify placement and resource allocation of the plurality of applications in the system in accordance with the application placement;

wherein an execution profile for a given interactive workload-type application comprises an average number of processor cycles consumed by requests of a given flow associated with the given interactive workload-type application, and an execution profile for a given non-interactive workload-type application comprises the number of processor cycles used to complete a job associated with the given non-interactive workload-type application, the number of threads used by the job, and the maximum processor speed at which the job progresses.

12. The apparatus of claim 11, wherein the operations of classifying the plurality of applications, classifying one or more of the plurality of applications, computing a utility function, computing an application placement, and modifying placement and resource allocation is performed periodically in response to system events.

13. The apparatus of claim 11, wherein, in the operation of obtaining an execution profile, the heterogeneous applications comprise all long-running applications known to the system.

14. The apparatus of claim 11, wherein the processor is further operative to compute an intermediate utility function for each of the one or more of the plurality of applications based on a processing unit assigned to the one or more of the plurality of applications in the given one of the one or more collections.

15. The apparatus of claim 14, wherein the processor is further operative to use the intermediate utility function to obtain a processing unit allocation for a given application to achieve a certain utility.

16. The apparatus of claim 14, wherein the processor is further operative to use the intermediate utility function to obtain a resultant utility of a given application given total processing unit allocation to the given one of the one or more collections.

17. The apparatus of claim 14, wherein, in the operation of computing an intermediate utility function, the intermediate utility functions for each collection of applications are updated each time the placement of any application within the associated collection is changed as the algorithm progresses.

18. A method for making a computer implemented process for the management of a system of heterogeneous applications comprising the steps of:
instantiating first computer instructions onto a non-transitory computer readable medium, the first computer instructions configured to classify a plurality of applications into a plurality of application types, wherein the plurality of applications comprises heterogeneous applications, and the heterogeneous applications comprise at least one interactive workload-type application and at least one non-interactive workload-type application;

instantiating second computer instructions onto a non-transitory computer readable medium, the second computer instructions configured to classify one or more of the plurality of applications in each of the plurality of application types into one or more collections;

instantiating third computer instructions onto a non-transitory computer readable medium, the third computer instructions configured to compute a utility function of possible resource allocations for each of the one or more collections comprising the steps of: (i) obtaining an execution profile for each of the plurality of applications in a given one of the one or more collections; (ii) obtaining management policies for each of the plurality of applications; and (iii) computing the utility function for the given one of the collections in accordance with the execution profiles for the plurality of applications, service level agreement goals for the plurality of applications, and a state of the system;

instantiating fourth computer instructions onto a non-transitory computer readable medium, the fourth computer instructions configured to compute an application placement that optimizes a global utility of the plurality of applications in accordance with the one or more utility functions; and instantiating fifth computer instructions onto a non-transitory computer readable medium, the fifth computer instructions configured to modify placement and resource allocation of the plurality of applications in the system in accordance with the application placement;

wherein an execution profile for a given interactive workload-type application comprises an average number of processor cycles consumed by requests of a given flow associated with the given interactive workload-type application, and an execution profile for a given non-interactive workload-type application comprises the number of processor cycles used to complete a job associated with the given non-interactive workload-type application, the number of threads used by the job, and the maximum processor speed at which the job progresses.

* * * * *